Feb. 2, 1932. V. G. APPLE 1,843,591
ARMATURE FOR DYNAMO ELECTRIC MACHINES
Filed Oct. 26, 1928
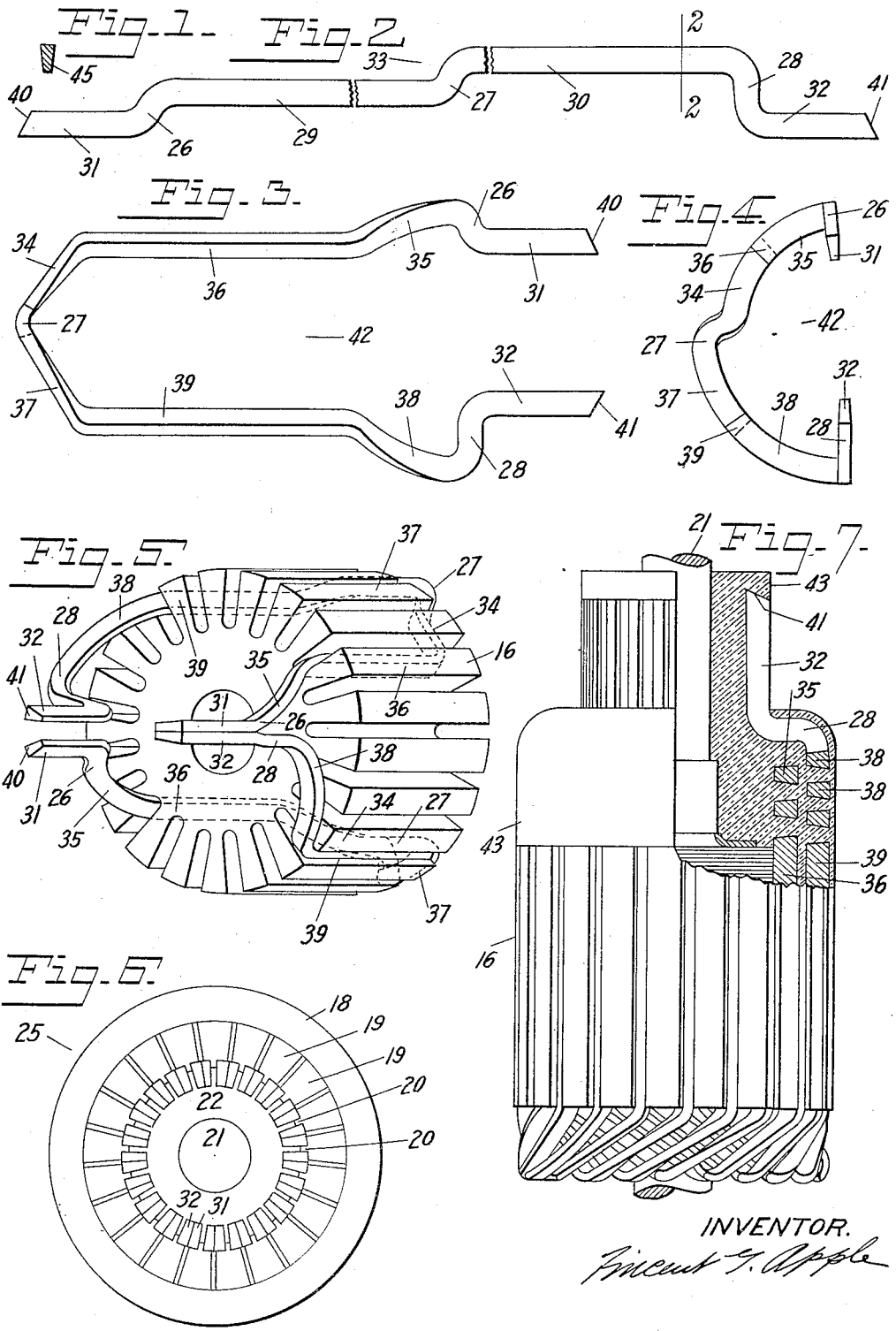
INVENTOR.
Vincent G. Apple Patented Feb. 2, 1932

1,843,591

UNITED STATES PATENT OFFICE

VINCENT G. APPLE, OF DAYTON, OHIO

ARMATURE FOR DYNAMO ELECTRIC MACHINES

Application filed October 26, 1928. Serial No. 315,340.

This invention is shown, tho not claimed, in my co-pending application Serial Number 234,158 and relates to bar wound armature coils suitable for radial entry into open core slots, the open ends of the loops being somewhat prolonged and so located relative to the remainder of the bar that commutator segments may be composed of pairs thereof.

An object of the invention is to reduce the cost of an armature by eliminating the separately made commutator, thereby reducing the number of parts and the amount of labor and material required.

Another object is to improve the electric circuit thru an armature by eliminating the soldered, brazed or welded joints commonly made to connect the bars of the winding to the commutator segments.

Further objects will be apparent from a consideration of the following description, reference being had to the drawings wherein—

Fig. 1 is a cross section thru a form of wire from which the loops may be made.

Fig. 2 shows a step in the method of forming the wire Fig. 1 into a loop.

Fig. 3 is a plan view of the completely formed loop.

Fig. 4 is an end view of Fig. 3.

Fig. 5 shows two loops Fig. 3 in a core.

Fig. 6 is a top view of a mold used to bind the ends of loops Fig. 3 together.

Fig. 7 shows a completed armature wound with loops Fig. 3.

Similar numerals refer to similar parts thruout the several views.

In the drawings, a length of wire 33 of a cross section 45 Fig. 1 is first offset as at 26, 27 and 28 Fig. 2, forming a leg 29 which later becomes a conductor bar of the inner layer of the winding, a leg 30 which later becomes a conductor bar of the outer layer of the winding and two lugs 31 and 32 which later become layers of the cylindrical ring which forms the commutator. Lugs 31 and 32 are in alignment in Fig. 2.

The bar 33 is next bent to form loop 42 shown in plan view Fig. 3 and end view Fig. 4, where a portion of leg 29 Fig. 2 forms back lead 34 and a portion forms front lead 35, the remainder forming inner layer conductor bar 36, and where a portion of leg 30 Fig. 2 forms back lead 37 and a portion forms front lead 38, the remainder forming outer layer conductor bar 39. Lugs 31 and 32 are beveled as at 40 and 41 respectively for reasons hereinafter disclosed.

Fig. 5 shows two loops 42 laid in the slots of a core 16, two lugs 31 and 32 being circumferentially adjacent to form one commutator segment and to join the two loops shown in continuous circuit. The entire winding is assembled in the same manner.

After an entire winding is placed in the slots of core 16, the core and winding are together placed in mold 25, a top view of which is shown in Fig. 6 with the armature in place, where insulation may be molded about shaft 21 to fill space 22 and extend outwardly between the commutator segments as far as tangs 20 of jaws 19 will permit. Each commutator segment comprises a lug 31 and a lug 32 circumferentially adjacent and in electrical contact.

A completed armature is shown in Fig. 7 where insulation 43 extends between and about front leads 35 and 38, between shaft 21 and lugs 31 and 32 and around beveled ends 40 and 41 of said lugs to bind the whole together to compose a commutator.

The winding loops herein shown are particularly applicable where the core contains a large number of apertures and the commutator therefore a large number of segments, since the greater the number of winding apertures, the deeper and thinner the conductor bars become, and the more nearly rectangular is the cross section of the bar, making it suitable to be placed one bar above another in the same winding aperture with minimum waste of space therein.

Having described my invention, I claim—

As the unit of the winding of an armature, said armature comprising, a core with winding slots, two cylindrical rows of conductors, one row within the other extending through said slots and a commutator cylinder comprising the ends of the bars in a single cylindrical row of smaller diameter than either of said rows of conductors, said unit comprising a single bar of uniform cross section throughout its length starting at the outer end of the commutator cylinder and extending lengthwise through said commutator cylinder, constituting a segment thereof, radially outward to the inner row of conductors, helically to the end of the core, endwise through the inner half of a core slot, helically away from the core to a point beyond the end of the core, radially outward to the outer row of conductors, helically toward the core to the end of the core, endwise through the outer half of a core slot, said slot being angularly spaced apart from the first said slot, helically to a point near the inner end of the commutator cylinder, radially inward to the commutator cylinder then lengthwise through the said commutator cylinder constituting another segment thereof angularly spaced apart from the first said segment.

In testimony whereof I hereunto subscribe my name.

VINCENT G. APPLE.